US012579442B2

(12) United States Patent
Grigorescu et al.

(10) Patent No.: US 12,579,442 B2
(45) Date of Patent: Mar. 17, 2026

(54) TRAINING OF A CONVOLUTIONAL NEURAL NETWORK

(71) Applicant: Elektrobit Automotive GmbH, Erlangen (DE)

(72) Inventors: Sorin Mihai Grigorescu, Brasov (RO); Bogdan Trasnea, Brasov (RO); Andrei Vasilcoi, Brasov (RO)

(73) Assignee: Elektrobit Automotive GmbH, Erlangen (DE)

( * ) Notice: Subject to any disclaimer, the term of this patent is extended or adjusted under 35 U.S.C. 154(b) by 1041 days.

(21) Appl. No.: 17/626,575

(22) PCT Filed: Jun. 17, 2020

(86) PCT No.: PCT/EP2020/066660
§ 371 (c)(1),
(2) Date: Jan. 12, 2022

(87) PCT Pub. No.: WO2021/008798
PCT Pub. Date: Jan. 21, 2021

(65) Prior Publication Data
US 2022/0269948 A1 Aug. 25, 2022

(30) Foreign Application Priority Data

Jul. 12, 2019 (EP) ..................................... 19464012

(51) Int. Cl.
*G06N 3/086* (2023.01)
*B60W 60/00* (2020.01)
(Continued)

(52) U.S. Cl.
CPC ......... *G06N 3/086* (2013.01); *B60W 60/0027* (2020.02); *G06V 10/774* (2022.01); *G08G 1/0125* (2013.01); *B60W 2050/0018* (2013.01)

(58) Field of Classification Search
CPC .............. G06N 3/086; B60W 60/0027; B60W 2050/0018; G06V 10/774; G08G 1/0125
(Continued)

(56) References Cited

U.S. PATENT DOCUMENTS

| | | | |
|---|---|---|---|
| 2019/0026958 A1* | 1/2019 | Gausebeck | G06T 7/579 |
| 2019/0205667 A1* | 7/2019 | Avidan | G06F 18/28 |

FOREIGN PATENT DOCUMENTS

| | | |
|---|---|---|
| WO | 2019053052 A1 | 3/2019 |

OTHER PUBLICATIONS

Du, et al., "Development of a genetic-algorithm-based nonlinear model predictive control scheme on velocity and steering of autonomous vehicles", IEEE Transactions on industrial electronics, vol. 63, Nov. 2016 (Year: 2016).*
(Continued)

*Primary Examiner* — Tsu-Chang Lee

(57) ABSTRACT

This disclosure is related to a method, a computer program code, and an apparatus for training a convolutional neural network for an autonomous driving system. The disclosure is further related to a convolutional neural network, to an autonomous driving system comprising a neural network, and to an autonomous or semi-autonomous vehicle comprising such an autonomous driving system. For training the convolutional neural network, in a first step real-world driving data are selected as training data. Furthermore, synthetic driving data are generated as training data. The convolutional neural network is then trained on the selected real-world driving data and the generated synthetic driving data using a genetic algorithm.

14 Claims, 4 Drawing Sheets

(51) Int. Cl.
| | |
|---|---|
| *G06V 10/774* | (2022.01) |
| *G08G 1/01* | (2006.01) |
| *B60W 50/00* | (2006.01) |

(58) Field of Classification Search
USPC .......................................................... 706/13
See application file for complete search history.

(56) References Cited

OTHER PUBLICATIONS

Huang et al., "Tradeoffs in neuroevolutionary learning-based real-time robotic task design in the imprecise computation framework", ACM transactions on cyber-physical systems, vol. 3, No. 2, Article 14, Oct. 2018 (Year: 2018).*

Behjat et al., "Adaptive genomic evolution of neural network topologies (AGENT) for state-of-action mapping in autonomous agents", 2019 International conference on robotics and automation (ICRA) Palais de congress de Montreal, Montreal, Canada, May 20-24, 2019 (Year: 2019).*

Arno et al., "Autonomous vehicle control: exploring driver modeling conventions by implementation of neuroevolutionary and knowledge-based algorithms", Master's thesis in system, control & mechatronics and complex adaptive systems, Department of Mechanics and Maritime Sciences, Chalmers University o (Year: 2018).*

S. Legg et al. "Human-level control through deep reinforcement learning", Nature, vol. 518, No. 7540, pp. 529-533, Feb. 2015.

S. Hochreiter et al. "Long short-term memory", Neural computation, vol. 9, No. 8, pp. 1735-1780, 1997.

J. Goodfellow et al. "Generative adversarial nets", in Advances in Neural Information Processing Systems 27: Annual Conference on Neural Information Processing Systems 2014, Dec. 8-13, 2014, Montreal, Quebec, Canada, 2014, pp. 2672-2680.

S. Grigorescu "Generative One-Shot Learning (GOL): A Semi-Parametric Approach for One-Shot Learning in Autonomous Vision", in Int. Conf. on Robotics and Automation ICRA 2018, Brisbane, Australia, May 21-25, 2018.

B.Paden et al. "A survey of motion planning and control techniques for self-driving urban vehicles", IEEE Trans. Intelligent Vehicles, vol. 1, No. 1, pp. 33-55, 2016.

Sorin Grigorescu et al. "NeuroTrajectory: A Neuroevolutionary Approach to Local State Trajectory Learning for Autonomous Vehicles", arxiv.org, Cornell University Library, Ithaca, NY, Jun. 26, 2019, XP081384330.

Preprint et al. "Gridsm: A Vehicle Kinematics Engine for Deep Neuroevolutionary Control in Autonomous Driving" Jan. 21, 2019, XP055723137, Retrieved from the Internet: URL:https://ww. researchgate.net/profile/Andrei Vasilcoi/publication/330439644 Grids im A Vehicle Kinematics Engine for Deep_Ne ur~evolutionary_ Controlin_Autonomous_Driv ing/links/5c459710a6fdccd65bcefc8/ Grids im-A-Vehicle-Kinematics-Engine-for-Deep-Neuroevolutionary-Control-in-Autonomous-Driving.pdf, retrieved on Aug. 17, 2020.

https://en.wikipedia.org/wiki/End-to-end_reinforcement learning.

International Search Report and Written Opinion dated Aug. 28, 2020, from corresponding International Patent Application No. PCT/EP2020/066660.

* cited by examiner

TRAINING OF A CONVOLUTIONAL NEURAL NETWORK

BACKGROUND

The present invention is related to a method, a computer program code, and an apparatus for training a convolutional neural network for an autonomous driving system. The invention is further related to a convolutional neural network, to an autonomous driving system comprising a neural network, and to an autonomous or semi-autonomous vehicle comprising such an autonomous driving system.

Learning human-like driving behaviors for autonomous cars is still an open challenge. The ability of an autonomous car to steer itself in a human-like fashion has become mainstream research in the quest for autonomous driving. An autonomous vehicle is an intelligent agent which observes its environment, makes decisions and performs actions based on these decisions. In order to implement these functions, sensory input needs to be mapped to control output.

BRIEF SUMMARY

The main approach for controlling autonomous vehicles currently are so-called Perception-Planning-Action pipelines. The driving problem is divided into smaller sub-problems, where separate components are responsible for environment perception, path planning and motion control. The output of each component represents input to the following module. The vehicle's sensors are used for building a comprehensive world model of the driving environment. Although the components are relatively easy to interpret due to their modularity, they are often constructed on manually chosen rules, which are unsuitable for learning complex driving strategies.

It is to be expected that in the field of autonomous driving, the traditional modular pipeline will migrate towards deep learning approaches, where sensory data is mapped to a driving behavioral strategy using monolithic deep neural systems.

Current deep learning techniques for autonomous driving are end2end and deep reinforcement learning, where the next best driving action is estimated through learning from driving recordings, or from exploring a simulated environment, respectively.

End2end [1] learning directly maps raw input data to control signals. The training data, often in the form of images from a front-facing camera, is collected together with time-synchronized steering angles recorded from a human driver. A convolutional neural network is then trained to output steering commands given input images of the road ahead. End2end systems are faced with the challenge of learning a very complex mapping in a single step. Although end2end behaves well in certain low-speed situations, a high capacity model together with a large amount of training data is required to learn corner cases with multi-path situations, such as a T-point or road intersection.

Deep Reinforcement Learning [2] is a type of machine learning algorithm, where agents are taught actions by interacting with their environment. The system does not have access to training data, but maximizes a cumulative reward, which is positive if the vehicle is able to maintain its direction without collisions, and negative otherwise. The reward is used as a pseudo label for training a deep neural network, which is then used to estimate a Q-value function approximating the next best driving action, given the current state. This is in contrast with end2end learning, where labelled training data is provided. The main challenge here is the training, since the agent has to explore its environment, usually through learning from collisions. Such systems perform well when deployed in the same simulation environment, but have a decrease in performance when ported to a real-world vehicle. This is because systems trained solely on simulated data tend to learn a biased version of the driving environment.

It is an object of the present invention to provide a solution for improving the training procedure of a convolutional neural network such that a more human-like driving behavior is achieved.

BRIEF SUMMARY

This object is achieved by a method for training a convolutional neural network for an autonomous driving system, by a computer program code, and by an apparatus for training a convolutional neural network for an autonomous driving system according to the independent claims. The dependent claims include advantageous further developments and improvements of the present principles as described below.

According to a first aspect, a method for training a convolutional neural network for an autonomous driving system comprises:

selecting real-world driving data as training data;

generating synthetic driving data as training data; and training the convolutional neural network on the selected real-world driving data and the generated synthetic driving data using a genetic algorithm.

Similarly, a computer program code comprises instructions, which, when executed by at least one processor, cause the at least one processor to train a convolutional neural network for an autonomous driving system by performing the steps of:

selecting real-world driving data as training data;

generating synthetic driving data as training data; and training the convolutional neural network on the selected real-world driving data and the generated synthetic driving data using a genetic algorithm.

The term computer has to be understood broadly. In particular, it also includes workstations and other processor-based data processing devices.

The computer program code can, for example, be made available for electronic retrieval or stored on a computer-readable storage medium.

According to a further aspect, an apparatus for training a convolutional neural network for an autonomous driving system:

a selecting unit for selecting real-world driving data as training data;

a processing unit for generating synthetic driving data as training data; and a training unit for training the convolutional neural network on the selected real-world driving data and the generated synthetic driving data using a genetic algorithm.

Known techniques tend to generalize on specific driving scenarios, e.g. highway driving, or they require learning through simulations which often aren't accurate enough for real-world use cases. In addition, it is very difficult to monitor their functional safety, since these systems predict the next best driving action, without estimating the vehicle's behaviour over a longer time horizon. To address these issues, the proposed solution introduces a multi-objective neuroevolutionary approach to autonomous driving, based on the reformulation of autonomous driving as a behaviour arbitration problem for an artificial agent. During training of a population of deep neural networks, each network individual is evaluated against a multi-objective fitness vector, with the purpose of establishing the so-called Pareto front of deep nets. For the training data a hybrid approach is used, which uses both synthetic data and real-world information.

In an advantageous embodiment, the training data are represented by paired sequences of occupancy grids and behavioral labels. For example, the behavioral labels may be composed of driving trajectories, steering angles and velocities. In contrast to other approaches, the present solution replicates the way in which a human person is driving a car. For this purpose the desired behavior is encoded in a three elements fitness vector, which describes the vehicle's travel path, lateral velocity and a longitudinal speed. Using these elements as behavioral labels during training helps calculating the driving behavior in a human-like fashion during runtime.

In an advantageous embodiment, the sequences of occupancy grids representing the real-world driving data and the synthetic driving data are processed in parallel by a set of convolutional layers before being stacked. The convolutional layers decrease the raw input's features space and thus simplify the input to the further processing units.

In an advantageous embodiment, the stacked processed occupancy grids are fed to an LSTM network (LSTM: Long short-term memory) via a fully connected layer. Details on LSTM networks can be found in [3]. LSTM networks are particularly good in predicting time sequences, such as the sequence of occupancy grids.

In an advantageous embodiment, the synthetic driving data are obtained using a generative process, which models the behavior of an ego vehicle and of other traffic participants. Using a generative process for obtaining synthetic driving data enables to learn driving behaviors for corner cases, which typically appear rarely during the driving process. Preferably, the generative process uses a single-track kinematic model of a robot for generating artificial motion sequences of virtual agents. Using a single-track kinematic model helps to reduce the complexity of the kinematic model.

In an advantageous embodiment, variables controlling the behavior of the virtual agents are, for each virtual agent, the longitudinal velocity and the rate of change of the steering angle. These variables allow controlling the virtual agents such that they replicate the way in which a human person is driving a car.

Advantageously, a convolutional neural network for an autonomous driving system is trained in accordance with a method according to the invention. Such a convolutional neural network is preferably used in an autonomous driving system, which may be comprised in an autonomous or semi-autonomous vehicle, e.g. for selecting a driving strategy. The convolutional neural network may be provided as a computer program code comprising instructions, which, when executed by at least one processor, cause the at least one processor to implement the convolutional neural network.

The term computer has to be understood broadly. In particular, it also includes embedded devices and other processor-based data processing devices.

The computer program code can, for example, be made available for electronic retrieval or stored on a computer-readable storage medium.

Further features of the present invention will become apparent from the following description and the appended claims in conjunction with the figures.

DETAILED DESCRIPTION

Figure 1:
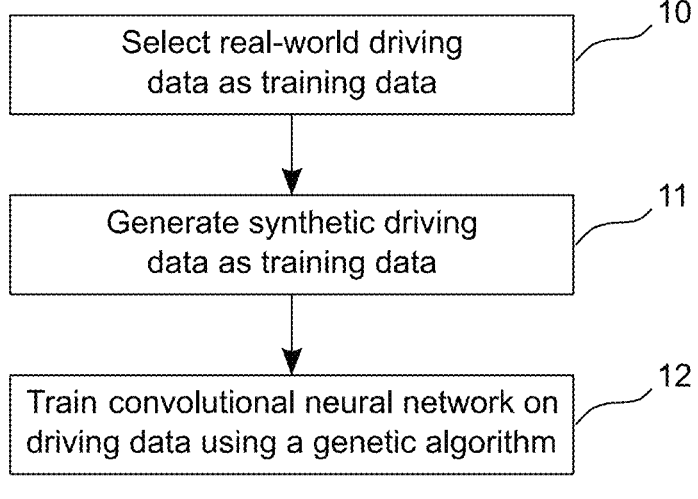
FIG. 1 schematically illustrates a method for training a convolutional neural network for an autonomous driving system.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 schematically illustrates a method for training a convolutional neural network for an autonomous driving system. In a first step real-world driving data are selected 10 as training data. Furthermore, synthetic driving data are generated 11 as training data. For example, the synthetic driving data may be obtained using a generative process, which models the behavior of an ego vehicle and of other traffic participants. For this purpose, the generative process may use a single-track kinematic model of a robot for generating artificial motion sequences of virtual agents. The behavior of the virtual agents may be controlled by a number of variables, e.g. the longitudinal velocity and the rate of change of the steering angle. The convolutional neural network is then trained 12 on the selected real-world driving data and the generated synthetic driving data using a genetic algorithm. Preferably, the training data are represented by paired sequences of occupancy grids and behavioral labels. For example, the behavioral labels may be composed of driving trajectories, steering angles and velocities. Advantageously, the sequences of occupancy grids representing the real-world driving data and the synthetic driving data are processed in parallel by a set of convolutional layers before being stacked. The stacked processed occupancy grids may then be fed to an LSTM network via a fully connected layer.

Figure 2:
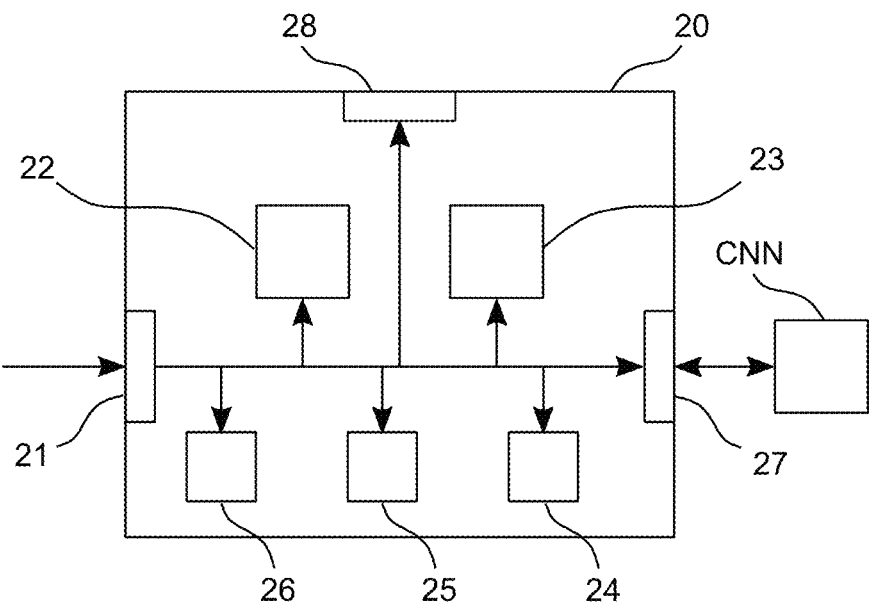
FIG. 2 schematically illustrates a first embodiment of an apparatus for training a convolutional neural network for an autonomous driving system.

FIG. 2 schematically illustrates a block diagram of a first embodiment of an apparatus 20 for training a convolutional neural network CNN for an autonomous driving system. The apparatus 20 has an input 21 for receiving data, e.g. driving data. A selecting unit 22 selects real-world driving data as training data. Furthermore, a processing unit 23 generates synthetic driving data as training data. For example, the processing unit 23 may generate the synthetic driving data using a generative process, which models the behavior of an ego vehicle and of other traffic participants. For this purpose, the generative process may use a single-track kinematic model of a robot for generating artificial motion sequences of virtual agents. The behavior of the virtual agents may be controlled by a number of variables, e.g. the longitudinal velocity and the rate of change of the steering angle. The apparatus 20 further has a training unit 24 for training the neural network CNN on the selected real-world driving data and the generated synthetic driving data via an interface 27. For this purpose the training unit 24 preferably uses a genetic algorithm. The interface 27 may also be combined with the input 21 into a single bidirectional interface. Data generated by the apparatus 20 can likewise be stored in a local storage unit 26. Preferably, the training data are represented by paired sequences of occupancy grids and behavioral labels. For example, the behavioral labels may be composed of driving trajectories, steering angles and velocities. Advantageously, the sequences of occupancy grids representing the real-world driving data and the synthetic driving data are processed in parallel by a set of convolutional layers before being stacked. The stacked processed occupancy grids may then be fed to an LSTM network via a fully connected layer.

The selecting unit 22, the processing unit 23, and the training unit 24 may be controlled by a controller 24. A user interface 28 may be provided for enabling a user to modify settings of the selecting unit 22, the processing unit 23, the training unit 24, or the controller 25. The selecting unit 22, the processing unit 23, the training unit 24, and the controller 25 can be embodied as dedicated hardware units. Of course, they may likewise be fully or partially combined into a single unit or implemented as software running on a processor.

Figure 3:
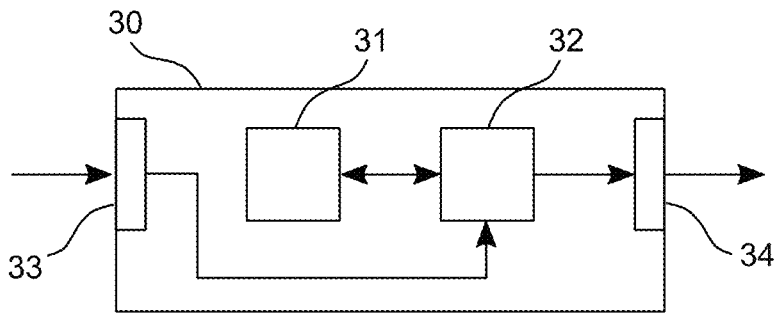
FIG. 3 schematically illustrates a second embodiment of an apparatus for training a convolutional neural network for an autonomous driving system.

A block diagram of a second embodiment of an apparatus 30 for training a convolutional neural network for an autonomous driving system is illustrated in FIG. 3. The apparatus 30 comprises a processing device 31 and a memory device 32. For example, the apparatus 30 may be a computer or an electronic control unit. The memory device 32 has stored instructions that, when executed by the processing device 31, cause the apparatus 30 to perform steps according to one of the described methods. The instructions stored in the memory device 32 thus tangibly embody a program of instructions executable by the processing device 31 to perform program steps as described herein according to the present principles. The apparatus 30 has an input 33 for receiving data. Data generated by the processing device 31 are made available via an output 34. In addition, such data may be stored in the memory device 32. The input 33 and the output 34 may be combined into a single bidirectional interface.

The processing device 31 as used herein may include one or more processing units, such as microprocessors, digital signal processors, or a combination thereof.

The local storage unit 25 and the memory device 32 may include volatile and/or non-volatile memory regions and storage devices such as hard disk drives, optical drives, and/or solid-state memories.

In the following, a more detailed description of the present approach for training a convolutional neural network for an autonomous driving system shall be given with reference to FIG. 4 to FIG. 6.

The present approach to human-like autonomous driving is to reformulate behavior arbitration as a cognitive learning task, where the robust temporal predictions of LSTMs are combined with a generative model. The generative model allows learning driving behaviors for corner cases, which typically appear rarely during the driving process.

Figure 4:
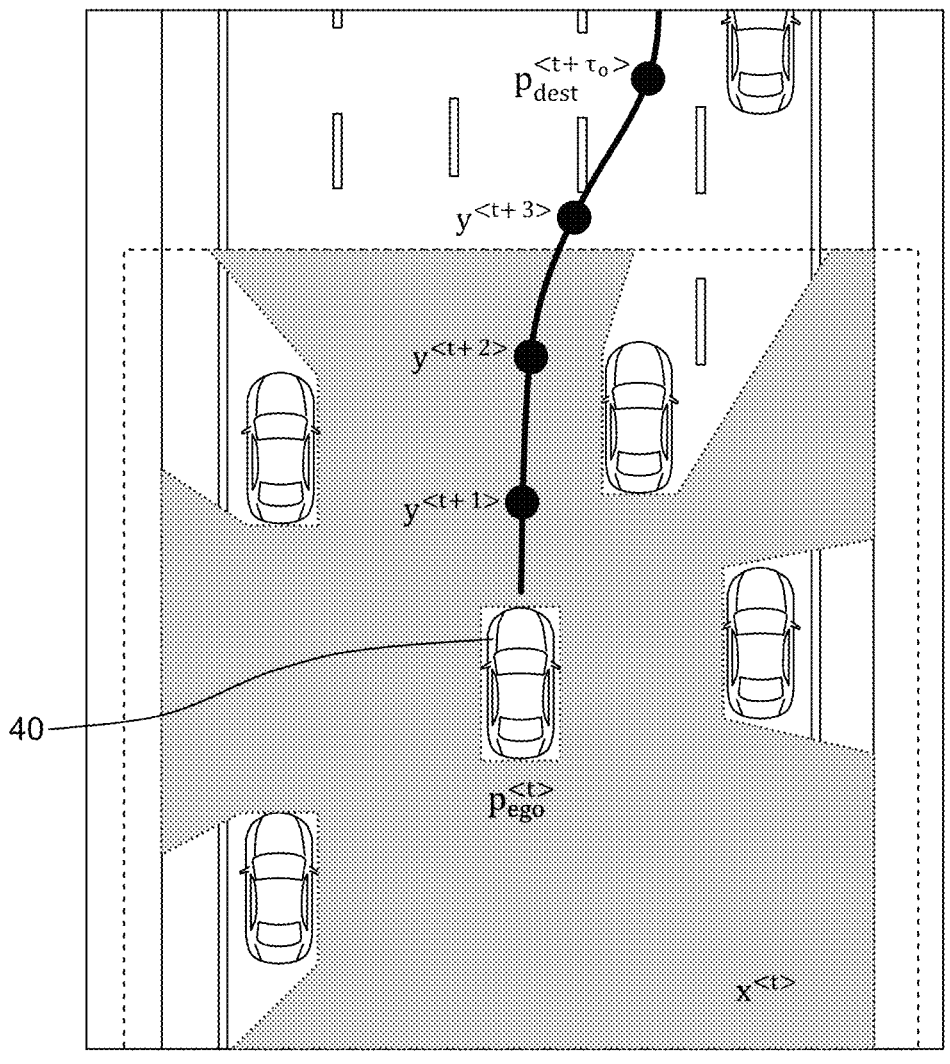
FIG. 4 illustrates the problem space of the proposed behavior arbitration learning.

An illustration of the problem space is shown in FIG. 4. Given a sequence of 2D occupancy grids $I: R^2 \times \tau_i > R^2 \times \tau_o$, the position of the ego-vehicle $p_{ego}^{<t>}$ in $R^2$ in $I^{<t>}$, and the destination coordinates $p_{dest}^{<t>} \in R^2$ in occupancy grid space at time t, the task is to learn a behavior arbitration strategy for navigating the ego-vehicle to the destination coordinates $p_{dest}^{<t+\tau_o>}$. $\tau_i$ is the length of the input occupancy grids, while $\tau_o$ is the number of time steps for which the motion of the ego-vehicle is planned. In other words, with $p_0^{<t>}$ being a coordinate in the current occupancy grid observation $I^{<t>}$, a human-like navigation strategy of the ego-vehicle is sought from any arbitrary starting point $p_0^{<t>}$ to $p_{dest}^{<t+\tau_o>}$. The navigation strategy is subject to certain constraints. First, the travelled path $\|p_0^{<t>} - p_{dest}^{<t+\tau_o>}\|$ shall be minimal. Second, the lateral velocity, given by the rate of change of the steering angle $v_\delta \in [\delta_{min}, \delta_{max}]$, is minimal, that is a minimal value for $v_\delta^{<t,t+\tau_o>}$. Third, the forward speed, or longitudinal velocity $v_f^{<t,t+\tau_o>}$, is maximal and bounded to an acceptable range $[v_{min},v_{max}]$.

The above problem can be modelled as a Markov Decision Process M=(S,A,T,L), where:

S represents a finite set of states, where $s^{<t>} \in S$ is the state of the agent at time t. To encode the location of the agent in the driving occupancy grid space at time t, $s^{<t>}=I(p_{ego}^{<t-\tau_i,t>})$ is defined, which denotes an axis-aligned discrete grid sequence in the interval $[t-\tau_i,t]$, centered on the ego-vehicle positions $p_{ego}^{<t-\tau,t>}$.

A represents a finite set of behavioral action sequences allowing the agent to navigate through the environment defined by $I(p^{<t-\tau_i,t>})$, where $a^{<t+1,t+\tau_o>} \in A$ is the future predicted optimal behavior the agent should perform in the next time interval $[t+1,t+\tau_o]$. A behavior $a^{<t+1,t+\tau_o>}$ is defined as a collection of estimated trajectory set-points:

$$a^{<t+1,t+\tau_o>} = Y^{<t+1,t+\tau_o>} \qquad (1)$$

$$= [y^{<t+1>}, y^{<t+2>}, \ldots, y^{<t+\tau_o>}]$$

T:S×A×S→[0,1] is a stochastic transition function, where $$T_{s^{<t>},a^{<t+1,t+\tau_o>}}^{s^{<t+\tau_o>}}$$

describes the probability of arriving in state $s^{<t+\tau_o>}$ after performing the behavioral actions $a^{<t+1,t+\tau_o>}$ in state $s^{<t>}$.

L:S×A×S→$R^3$ is a multi-objective fitness vector function, which quantifies the behavior of the ego-vehicle:

$$L_{s^{<t>},a^{<t+1,t+\tau_o>}}^{s^{<t+\tau_o>}} = [l_1^{<t+\tau_o>} l_2^{<t+\tau_o>} l_3^{<t+\tau_o>}]. \qquad (2)$$

The elements in Equation (2) are defined as:

$$l_1^{<t+\tau_o>} = \sum_{i=1}^{\tau_o} \lVert p_{ego}^{<t+i>} - p_{dest}^{<t+i>} \rVert_2^2, \qquad (3)$$

$$l_2^{<t+\tau_o>} = \sum_{i=1}^{\tau_o} v_\delta^{<t+i>} \qquad (4)$$

$$l_3^{<t+\tau_o>} = v_f^{<t,t+\tau_o>} \in [v_{min}, v_{max}] \qquad (5)$$

Intuitively, $l_1^{<t+\tau_o>}$ represents a distance-based feedback, which is smaller if the car follows a minimal energy trajectory to $p_{dest}^{<t+\tau_o>}$ and large otherwise. $l_2^{<t+\tau_o>}$ quantifies hazardous motions and passenger discomfort by summing up the lateral velocity of the vehicle. The feedback function $l_3^{<t+\tau_o>}$ is the moving longitudinal velocity of the ego-vehicle, bounded to speeds appropriate for different road sectors, e.g. $v_f^{<t,t+\tau_o>} \in [80 \text{ kmh}, 130 \text{ kmh}]$ for the case of highway driving.

Considering the proposed behavior arbitration scheme, the goal is to train an optimal approximator, defined here by a deep network φ, which can predict the optimal behavior strategy $a^{<t+1,t+\tau_o>}$ of the ego-vehicle, given a sequence of occupancy grid observations $X^{<t-\tau_i,t>}$ and the multi-objective fitness vector from Equation 2.

Figure 5:
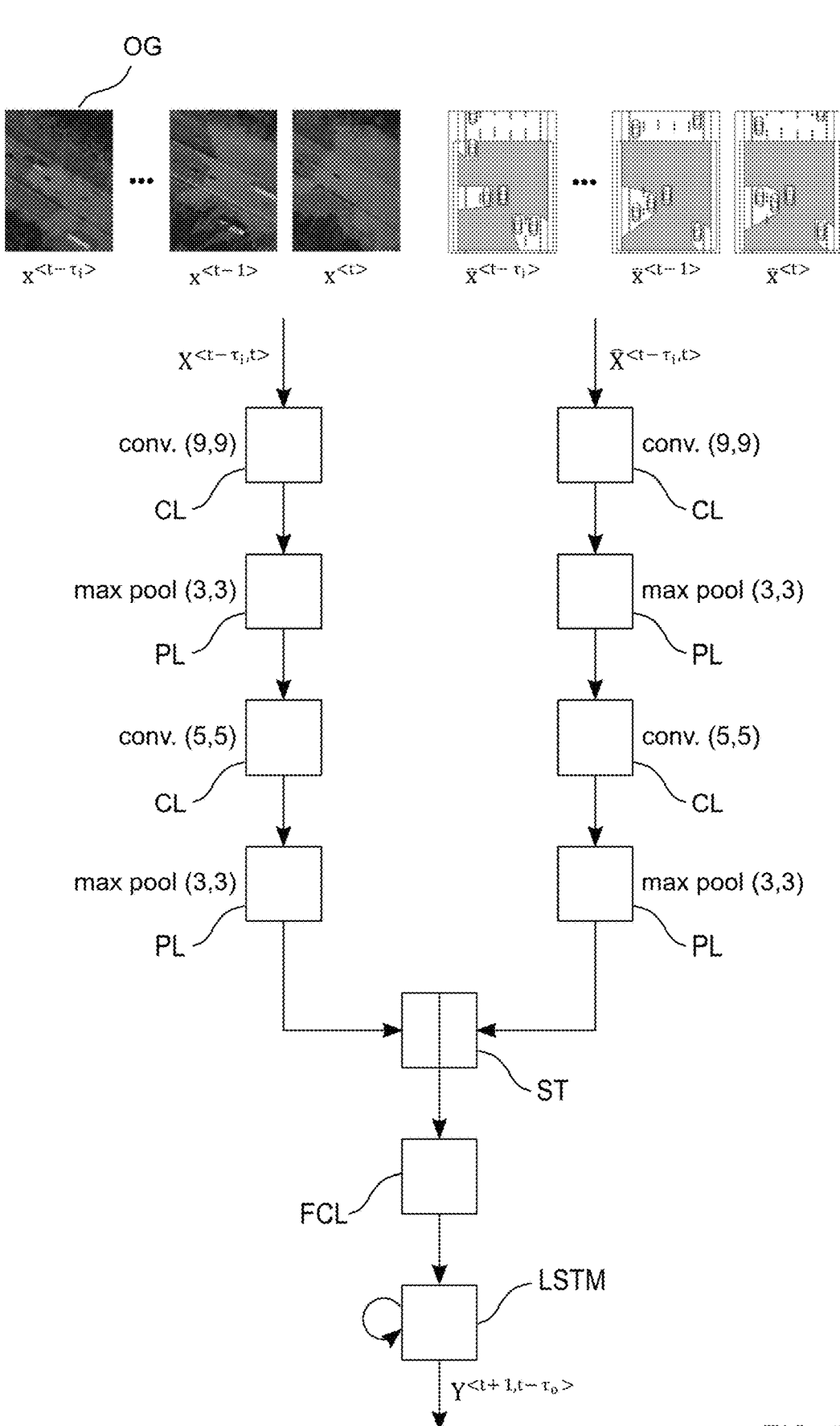
FIG. 5 depicts a deep neural network architecture for learning optimal driving behaviors.

For computing the behavior strategy of the ego-vehicle, a deep network has been designed, which is illustrated in FIG. 5. The occupancy grid sequences are processed by a set of convolutional layers, before feeding them to an LSTM network. In order to train the deep network on as many corner cases as possible, a training dataset has been constructed based on real-world occupancy grid samples $X^{<t-\tau_i,t>}$, as well as on synthetic sequences $\hat{X}^{<t-\tau_i,t>}$. As explained in the next section, synthetic data is generated in an occupancy grid simulation environment based on a kinematic model of simulated traffic participants.

As network parameters θ, both the weights of the LSTM network as well as the weights of the convolutional layers are consider. As shown in FIG. 5, the two synthetic and real-world data streams are processed in parallel by two convolutional networks, before being stacked upon each other and fed to the LSTM network via a fully connected layer of 256 units. The first convolutional layer in each network has 48 kernel filters, with a size of 9×9. The second layer consists of 96 kernels of size 5×5. During runtime, the optimal driving behaviour strategy $Y^{<t+1,t-\tau_o>}$ is computed solely from real-world occupancy grid sequences.

For training the deep network of FIG. 5, the training dataset $\mathcal{D}$ has been composed of synthetic and real-world data occupancy grid sequences:

$$\mathcal{D} = \begin{cases} \left( \hat{X}^{<t-\tau_i,t>}, \hat{Y}^{<t+1,t+\tau_o>} \right) \sim P\left( X^{<t-\tau_i,t>}, Y^{<t+1,t+\tau_o>} \right), \\ \left( X^{<t-\tau_i,t>}, Y^{<t+1,t+\tau_o>} \right) \sim P\left( X^{<t-\tau_i,t>}, Y^{<t+1,t+\tau_o>} \right), \end{cases} \qquad (6)$$

where $P(X^{<t-\tau_i,t>}, Y^{<t+1,t-\tau_i>})$ is an occupancy grid and vehicle behavior data generation distribution.

The generative process uses the single-track kinematic model of a robot for generating artificial motion sequences of virtual agents [4]. The single-track model, which is also known as the car-like robot, or the bicycle model, consists of two wheels connected by a rigid link. The wheels are restricted to move in a 2D plane coordinate system. In order to generate these sequences, a driving simulator has been built based on an occupancy grid sensor model. Different traffic participants, also called agents, are added within the simulation with different driving behaviors.

In the considered kinematic model, the variables controlling the behavior of the virtual agents are, for each agent, the longitudinal velocity $v_f$, bounded to a velocity interval $v_f \in [v_{min},v_{max}]$, and the steering angle's velocity $v_\delta \in [\dot{\delta}_{min}, \dot{\delta}_{max}]$.

Since the multi-objective loss vector of Equation 2 is used to quantify the response of the deep network of FIG. 5, it has been chosen to learn its weights Θ via evolutionary computation, as described in the following.

The training aims to compute optimal weights for a collection of deep neural networks φ(•;Θ) by simultaneously optimizing the elements of the fitness vector indicated in Equations 3 to 5.

Traditional training approaches use algorithms such as backpropagation and a scalar loss function to compute the optimal weight values of a single network. In the present approach, evolutionary computation is used to train a collection of deep networks φ(•;Θ). The three functions give a quantitative measure of the network's response, thus forming a multi-objective loss which is used to find the weights of φ(•;Θ). The training procedure does not search for a fixed set of weights, or even a finite set, but for a Pareto-optimal collection of weights $\Theta^*$, where each element in the collection represents a Pareto-optimal deep neural network $\varphi^*(\bullet; \Theta^*)$.

Figure 6:
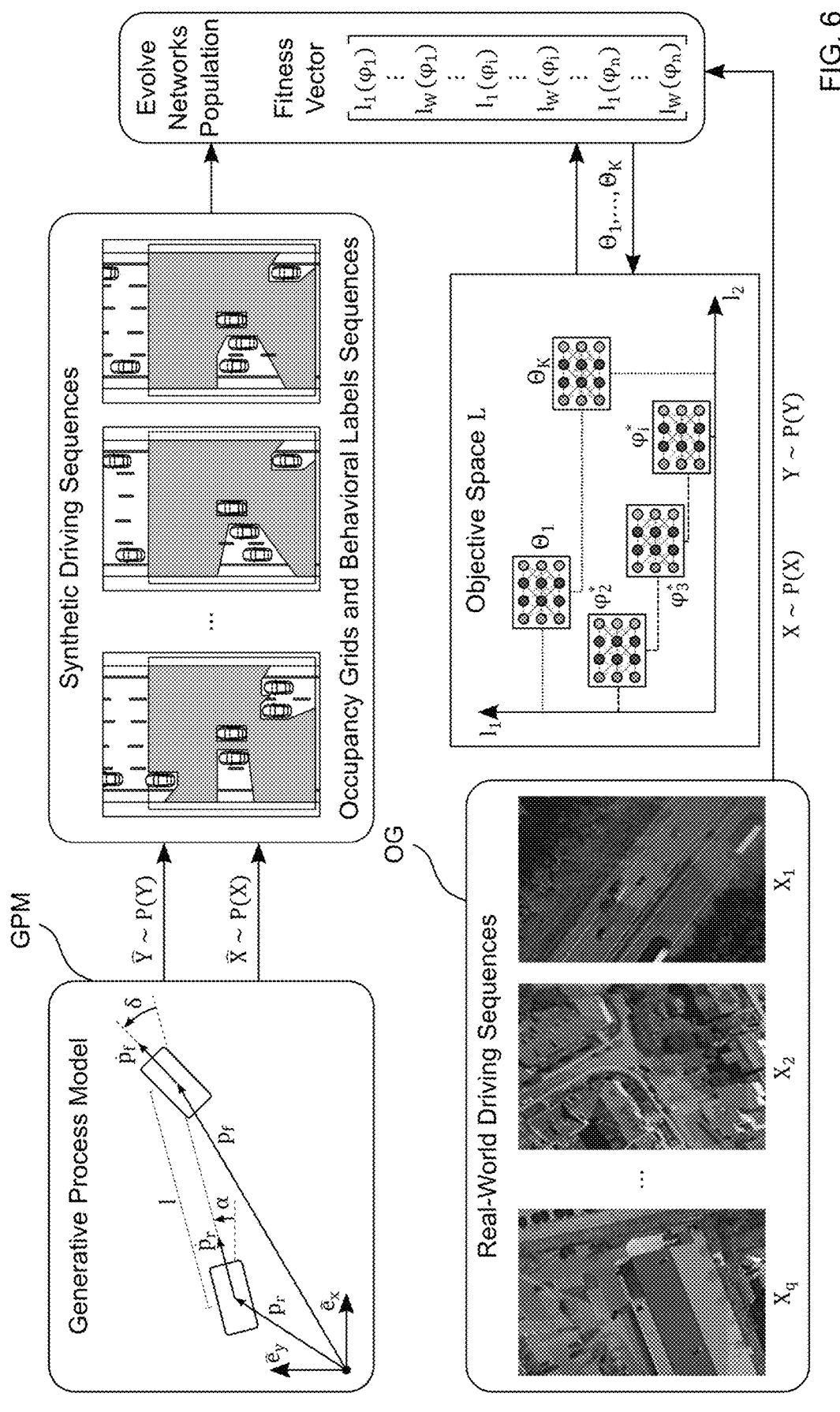
FIG. 6 illustrates the overall concept of evolutionary behavior arbitration learning for autonomous driving.

FIG. 6 illustrates the overall concept of evolutionary behavior arbitration learning for autonomous driving. The synthetic driving sequences are calculated from a generative process model, which mimics the behaviour of the ego-vehicle and of the traffic participants. The generative system is based on the single-track kinematic model of a non-holonomic robot. The model generates both synthetic occupancy grid sequences $\hat{X}{\sim}P(X)$, as well as behavioral labels $\hat{Y}{\sim}P(Y)$. Both the synthetic data and the real-world driving sequences X, Y are drawn from the real-world probability distributions P(X) and P(Y). The combined data is used to evolve a neural networks population $\varphi_1(\bullet;\Theta_1), \ldots, \varphi_K(\bullet;\Theta_K)$ by learning their weights $\Theta_1, \ldots, \Theta_K$ using genetic algorithms. The learning aims to minimize a multi-objective fitness vector $L=[l_1(\varphi), \ldots, l_H(\varphi)]$ in the multidimensional objective space L, where each coordinate axis represents a fitness value. The best performing networks $\varphi^*(\bullet;\Theta^*)$ lie on the so-called Pareto front in objective space.

REFERENCES

[1] https://en.wikipedia.org/wiki/End-to-end_reinforcement_learning

[2] V. Mnih et al.: "Human-level control through deep reinforcement learning", Nature, Vol. 518 (2015), pp. 529-533.

[3] S. Hochreiter et al: "Long short-term memory", Neural computation, Vol. 9 (1997), pp. 1735-1780.

[4] B. Paden et al.: "A survey of motion planning and control techniques for self-driving urban vehicles", IEEE Trans. Intelligent Vehicles, Vol. 1 (2016), pp. 33-55.

The invention claimed is:

1. A method for operating an autonomous driving system of an ego vehicle, the method comprising:

training a convolutional neural network including selecting real-world driving data (X) as training data;
generating synthetic driving data ($\hat{X}$) as training data; and
training the convolutional neural network on the selected real-world driving data (X) and the generated synthetic driving data ($\hat{X}$) using a genetic algorithm;
selecting a driving strategy based on an output of the convolutional neural network; and
controlling steering of the ego vehicle using the driving strategy.

2. The method according to claim 1, wherein the training data are represented by paired sequences of occupancy grids and behavioral labels (Y, $\hat{Y}$).

3. The method according to claim 2, wherein the behavioral labels (Y, $\hat{Y}$) are composed of driving trajectories, steering angles and velocities.

4. The method according to claim 3, wherein the sequences of occupancy grids representing the real-world driving data (X) and the synthetic driving data ($\hat{X}$) are processed in parallel by a set of convolutional layers before being stacked.

5. The method according to claim 4, wherein the stacked processed occupancy grids are fed to an LSTM network via a fully connected layer.

6. The method according to claim 5, wherein the synthetic driving data ($\hat{X}$) are obtained using a generative process, which models the behavior of the ego vehicle and of other traffic participants.

7. The method according to claim 6, wherein the generative process uses a single-track kinematic model of a robot for generating artificial motion sequences of virtual agents.

8. The method according to claim 7, wherein variables controlling the behavior of the virtual agents are, for each virtual agent, the longitudinal velocity and the rate of change of the steering angle.

9. An autonomous driving system configured to select a driving strategy, comprisng:

a convolutional neural network (CNN) that has been trained by:
selecting real-world driving data (X) as training data;
generating synthetic driving data ($\hat{X}$) as training data; and
training the convolutional neural network on the selected real-world- driving data (X) and the generated synthetic driving data ($\hat{X}$) using a genetic algorithm; and
a controller configured to output steering commands to control an ego vehicle using the driving strategy.

10. The autonomous driving system according to claim 9, wherein the training data are represented by paired sequences of occupancy grids and behavioral labels (Y, $\hat{Y}$).

11. The autonomous driving system according to claim 10, wherein the behavioral labels (Y, $\hat{Y}$) are composed of driving trajectories, steering angles and velocities.

12. The autonomous driving system according to claim 11, wherein the sequences of occupancy grids representing the real-world driving data (X) and the synthetic driving data ($\hat{X}$) are processed in parallel by a set of convolutional layers before being stacked.

13. The autonomous driving system according to claim 12, wherein the stacked processed occupancy grids are fed to an LSTM network via a fully connected layer.

14. The autonomous driving system according to claim 13, wherein the synthetic driving data ($\hat{X}$) are obtained using a generative process, which models the behavior of an ego vehicle and of other traffic participants.

\* \* \* \* \*